April 23, 1935.  H. F. CARPENTER  1,998,443
ELECTRIC GENERATING SYSTEM
Filed Sept. 4, 1930
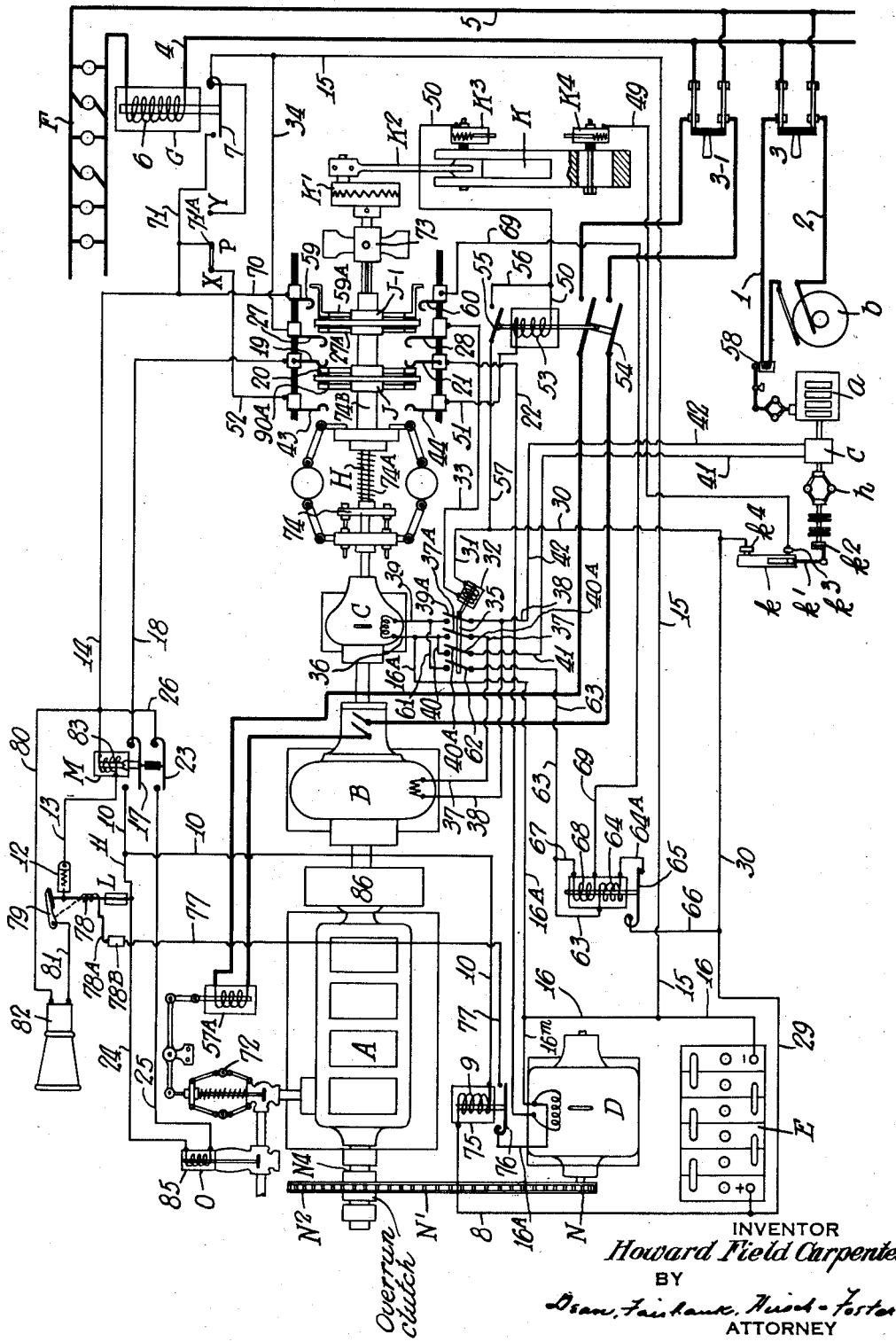
INVENTOR
*Howard Field Carpenter*
BY
*Dean, Fairbank, Hirsch-Foster*
ATTORNEY Patented Apr. 23, 1935

1,998,443

UNITED STATES PATENT OFFICE 1,998,443

ELECTRIC GENERATING SYSTEM

Howard Field Carpenter, White Plains, N. Y., assignor to Carpenter Automatic Electric Systems Company, Inc., White Plains, N. Y., a corporation of Delaware Application September 4, 1930, Serial No. 479,615

7 Claims. (Cl. 290—30)

This invention relates to improvements in electrical systems for automatically starting, regulating, synchronizing and otherwise operating and stopping alternating current electric generating systems or units.

The invention therefore provides means for automatically operating two or more such units in "step" or parallel, one of such units being made to automatically step in and out as the load connected to the main line varies in predetermined degree. Such units may be disposed in proximate or close position.

The invention also provides the elimination of a large degree of manual attendance thereby reducing the cost of producing electric current.

The invention still further provides means for automatically starting a prime mover by rotating its crank shaft, in the proper direction, sufficiently to reach the required compression in its cylinder or cylinders, and automatically opening and closing a valve regulating the fuel supply and further governing its speed of rotation through the action of a magnetic governor, working to assist or oppose the mechanical governor, as load conditions fluctuate.

On the accompanying drawing I show, as a means of starting power, a storage battery and an electric motor connected by chain drive through a one direction over-run clutch to the engine crank shaft. I may also employ compressed air as a means of rotating the crank shaft whereby instead of switching battery current to the starting motor and later recharging the said battery, I will open an inlet valve from the air storage and automatically operate a compressor to restore the air storage to proper power pressure.

A further object of my invention resides in the provision of means whereby the storage or starting battery may be recharged, and be automatically disconnected from the charging current before it reaches a point of overcharge. This I accomplish through the employment of a specially constructed relay switch, having a series and shunt coil so connected as to oppose each other to the end the series coil will neutralize the effect of the shunt coil while battery charging current is passing over it, but when the counter E. M. F. of the battery is brought up to equal potential with the impressed E. M. F. of the charging generator, charging current will cease to flow to the battery and the series coil will be de-energized. At this moment the shunt coil will have sufficient power to draw the core or armature of the dual magnet coils into its windings, thus breaking the contact between the charging generator and the battery. When the unit is stopped, the battery recharging switch will re-set through the action of a spring.

An important object of my invention is the arrangement of certain circuit closing switches or contacts to provide the proper sequence of action, viz. the turning on and off of the starting current from the battery, the opening of the fuel admission valve, the closing of the exciter to the alternator prior to the closing of the alternator switch to the load line, the opening of the starting current switch to the starting motor when the engine starts running on fuel, the closing of the alternator main load line switch at a moment when its electrical condition is identical to that of the alternator or alternators, supplying current to the load line at that time, the placing in parallel of the exciters then in operation, and finally closing the battery charging switch. I also provide a time lag safety cut-out whereby in the event the incoming unit's engine fails to start running after being cranked by the starting mechanism, the battery starting current will be cut off from the starting motor and an alarm sounded. This I accomplish through the employment of a thermostatic switch that will function to open the battery starting current switch after the lapse of several minutes, the lag in its action being regulated by the amount of current admitted to its heater coil through a predetermined fixed resistance.

Another important object of my invention resides in the employment of fixed cam action switches, which when once set in the proper position, will make contact only when the respective alternators are in the exact position of rotation. This effects the same result as that produced by the alternators being rotated on the same shaft. These cam action contactors are adjustable and are exactly set before the units are to be operated automatically. Such setting can be accomplished by determining the exact relative positions of the armatures of the alternators, through the use of any of the well known methods in common practice, such as the dark or brilliant lamp system or the synchronoscope.

A further object of my invention resides in the provision of means for preventing "hunting" or "hogging" of the load by any of the alternators, This I accomplish through the use of magnetic governors, whose coils are in series with the respective alternator load lines, and whose cores or armatures either aid or oppose the action of the mechanical governors on the engines as the load conditions fluctuate.

A still further object of my invention is the provision of means for insuring the same sequence of starting and stopping an incoming or outgoing alternator commensurate with the common rules of practice, viz., bringing the incoming alternator up to proper speed, sending into the fields of the incoming alternator the exciting current before closing the main load line switch and closing the latter at the proper moment when the electrical conditions of both the running and load carrying alternator and the incoming alternator are identical.

The invention also contemplates means for transversely opening the main load line switch of the outgoing alternator before the field excitation has been suspended. In this connection it is not necessary to first reduce the speed of the outgoing alternator so that the remaining alternators have assumed the full load, as the outgoing alternator will not be discontinued until the load on the main line has been reduced to the proper point.

Other objects will appear as I proceed with the full description and embodiment of the invention, which, for the purposes of the present invention, I have illustrated in the single figure of the accompanying drawing, showing a diagrammatic sketch of the apparatus and electrical connections embodying my invention.

In the drawing the heavy lines represent the alternating current circuits and the light lines the direct current circuits. A indicates an internal combustion engine of the Diesel type. 86 its flywheel contains a bolted flange clutch to the shaft of the alternator B which in turn is directly connected to the shaft of the D. C. exciter C. The exciter shaft extends through a fly-ball operated sliding contactor H with an adjustable spring 74—A opposing the movement of sleeve 74—B upon which are key fastened discs J and J—1 each having two insulated contact rings 90—A and 20, and 27—A and 59A. Adjusted to two insulated bearing rods are shown eight spring switch contacts, four on each insulated rod and designated from left to right, at the top, as 43, 19, 27, and 59 respectively, and on the bottom as 44, 21, 28 and 60 respectively. This is intended to illustrate a circuit closing and opening device, whereby as the speed of the shaft from the engine through the alternator and exciter increases, the fly-balls will be centrifugally thrown outward, and the sleeve 74—B carrying the aforementioned discs J and J—1 will be drawn in towards the fly-balls against whatever tension may be set on spring 74—A. On this same shaft, there is provided a bearing 73 and beyond it an adjustable cam K—1 connected to an arm on which is a connecting rod K—2 engaged in a slide K. To the end of the connecting rod K—2 and on the stud bolt working in a slot on the side of slide K, there is provided a spring switch contact K—3 while on the farther end of slide K there is a second spring switch contact K—4, which is slightly adjustable, and is spaced at a distance slightly less than the full stroke of connecting rod K—2 to permit of slightly more than a momentary contact between K—3 and K—4.

I also provide an electric starting motor D, a small chain sprocket on its shaft extension N, a chain having links spaced to engage the teeth of sprocket N, and on the engine crank shaft extension, a larger sprocket N—2 also fitted with teeth to engage in the links of chain N—1. The large sprocket N—2 is connected to the shaft of the engine A by means of an over-run clutch N—4 of any suitable construction. By means of this over-run clutch, the motor D may drive the shaft of said engine, but when the engine is rotating at a greater speed than said motor, the sprocket N—2 runs idly. The details of the over-run clutch form no part of the present invention, and may be of any well-known standard construction.

A series magnet coil switch or solenoid 6 in the load line 4 has a magnet coil which is wound with a predetermined number of ampere turns and which acts on its armature or core to close switch 7 when a predetermined current in amperes is flowing to the load. This switch 7 opens when a predetermined reduction in the flow of current amperes to the load is effected.

A magnet valve O is provided which when energized will open the fuel line to the engine and when de-energized will close such fuel line. 72 is a mechanical fly-ball governor and 57—A a magnetic governor in series with the alternator load line, which will operate to either assist or oppose the mechanical governor on the engine A as the load increases or decreases. A thermostatic time lag switch L with a heating element 78 is designed to open the battery starting circuit in the event the engine fails to start properly when rotated by the starting motor, after the lapse of several minutes.

The distant or operating unit consists of an internal combustion engine $a$, an alternator $b$, an exciter $c$, a fly-ball operated sliding sequence contactor $h$, and the cam operated timing contactors $k$—3 and $k$—4 mounted on the slide $k$, the contactor $k$—3 being connected to the rod $k$—2 operated by the cam $k$—1.

Let us assume that this operating unit is running and carrying whatever load F may be on the circuit consisting of wires 1 and 2, switch 3, wires 4 and 5, solenoid G, and coil 6, and let us assume that the unit A and associated members are at rest. Then if the load F is increased and the flow of current through coil 6 of solenoid G is sufficient to magnetize its armature or core to close switch 7, current from battery E will flow to the starting motor D as follows: From positive battery E over wire 8, coil 9 of magnet switch 75, wire 10, wire 11, through shank of thermostatic contactor L, spring switch 12, wire 13, coil 83 of magnet switch M, wire 14, wire 71, blade 7 of series switch G, wire 15, and wire 16, to negative battery. Battery current passing through coil 83 of magnet switch M will magnetize its armature and close switch 17, and as switch 23 is rigidly connected to switch 17 through an insulation, it will also close. Battery current will now flow to the starting motor and also the fuel magnet valve as follows: From positive battery E over wire 8, coil 9 of magnet switch 75, wire 10, across blade 17, of switch M, wire 18, spring contactor 19, insulated contact ring of disc 20, spring contactor 21, wire 22, to the positive terminal of the starting motor D, back over wire 16, to negative battery E. At the same time positive battery current on wire 10 will flow over wire 11, wire 24, coil 85, fuel magnet switch O, wire 25, blade 23 of switch M, wire 26, wire 14 carrying negative battery current over wires 71, switch blade 7, wires 15 and 16 to negative battery E.

As battery current motors engine through sprocket N, chain N—1 and one direction over-run clutch N—2 and N—4, a heavy inrush of current will close switch 76 of magnet switch 75 through series coil 9. On the closing of switch 76, positive battery current over wire 10 will flow over wire 11 and passing through heater element 78 will return through wire 78—A and fixed resistor 78—B, wire 77, blade 76 of series magnet switch 75, wire 16—M to negative battery over wire 16.

As the engine is motored to the starting point fly-ball sliding contactor H begins placing tension on spring 74—A and as the speed of the engine is increased upon firing, sleeve 74—B upon which is keyed disc J, is drawn in towards the spring 74—A so that contact between insulated ring 20 on disc J and contact springs 19 and 21 is broken and the battery motoring current to the starting motor is discontinued and the crank shaft of engine A over runs the clutch N—4 of sprocket N—2.

In the event the engine fails to start upon motoring, and after a delay of approximately three to five minutes, the battery current through heater element 78 as impeded by resistor 78—B, will sufficiently heat the shank of thermostatic switch L to cause it to bend away from spring switch 12 which will open the line to coil 83 of switch M and cause switches 17 and 23 to open, thus shutting off the motoring battery current to the starting motor D and also the current to the magnet fuel valve O. At the same time, once shank L is heated sufficiently to start bending, it will continue to bend until it has lifted insulated latch 79, and latch 79 will fall by gravity and lock the shank of switch L in the open position. Latch 79 will then be in metallic contact with the positive battery current on the shank of thermostatic switch L and current will pass over wire 81 through alarm siren or bell 82, wire 80, back to negative battery over wires, 14, 71, switch 7, wires 15 and 16. Once latch 79 falls behind shank L, it will remain in that position and the alarm will continue until re-set by hand. As battery current to the starting motor D is switched off, current to the heater element is also discontinued through the opening of switch 76 which opens when current ceases to flow through series coil 9 of switch 75.

As engine A continues to speed up, fly-ball operated sliding contactor brings contact ring 27—A of disc J—1 into electrical contact with contact springs 27 and 28 to excite alternator as follows: Positive battery E current flows over wire 29, wire 30, wire 31, coil of exciter magnet switch 32, wire 33, to spring contact 28, contact ring 27—A of disc J—1 to spring contact 27, wire 34, and wire 15 and 16 back to negative battery E.

Exciter switch 35 is now closed and the fields of the alternator B are excited and the two exciters C and c are placed in parallel. Exciter c being partly loaded at the time, it will be of practically the same voltage as exciter C, which is now being rotated almost up to speed. This action is as follows: With the closing of exciter switch 35, positive exciter C current now flows over wire 39, switch blade 39—A, wire 38 to alternator fields, back over wire 37, switch blade 37—A, wire 36 to negative exciter. Exciter c is placed in parallel with wire 39, switch blade 39—A, wire 38, wire 42, wire 41, switch blade 40—A and wires 40 and 36. Thus both alternators C and c are being evenly excited.

As the engine A reaches equal speed with engine a which has been prearranged by the careful setting of governor 72, fly-ball sliding contactor H, causes ring 90—A of disc J to come into electrical contact with spring contacts 43 and 44 to close the main line switch 54 of alternator B, as follows: Positive battery E current now flows over wire 29, wire 30, to spring contact k—4, on cam operated contactors (shown at 180 degrees) and contact is made with spring contactor k—3 at each revolution of cam k—2 at an exact position of the armature of alternator b. When this contact is made current may flow over wire 49 to contactor K—4 which will also make contact with K—3 when the armature of alternator B is in an exact position of rotation. When this contact is made current may flow over wire 50 through coil 53 of alternator main switch, wire 51, spring contactor 44, contact ring 90—A of disc J, spring contact 43, wire 52 to single pole double throw switch P, wire 71—A, wire 71, blade 7 of solenoid G, wire 15 and wire 16, back to negative battery E.

The electrical contacts across contact ring 90—A of disc J and across blade of solenoid switch blade 7, remain closed and the moment of energizing the coil 53 of the alternator main switch now depends on the simultaneous closing of the contacts on the K k cam contactors. When these close approximately simultaneously (all have spring contacts that permit of a slight pause as the cams pass their dead centers) switch 53 will close and both the alternators will be in parallel, and at the exact moment, only, can the circuit to switch 54 be completed.

Cam K and k must be previously exactly set to close their contacts when each alternator armature is in the same position of rotation. This can be accomplished through one of any of the known means of synchronizing two or more alternators. The brilliant or dark lamp method or any suitable synchronoscope may be employed, but once set, no further adjustment is necessary and in the drawing the two K k cam closing contactors are shown in series to further illustrate the invention.

With the closing of switch 54, sustaining current for coil 53 is supplied through switch 55. This switch 55 is closed at the same moment as switch 54 because cam contactors would otherwise break the circuit to coil 53 and permit switch 54 to open again. The alternators B and b therefore will remain in parallel until solenoid 6 permits switch 7 to open thereby opening the current in coil 53.

Both alternators B and b are now in parallel, both exciters are in parallel, and both magnetic governors are in parallel. This arrangement is designed to prevent hunting or hogging by either alternator.

In order to provide means for recharging the battery E I have provided a relay with a series and shunt coil on the same armature, the action of which is as follows: When charging current is running to the battery through the series coil 64, the action of the shunt coil 68 is neutralized, the series coil 64 is also aided by a spring 65 that tends to hold the switch in a closed position. As the battery is charged, its counter E. M. F. builds up and when it equals the impressed E. M. F. of the charging generator, current ceases to flow through the series coil 65 and the shunt coil 68 has sufficient power to open the switch 65 against the spring tension. The switch, however, closes again immediately after the current is switched off the shunt coil. When exciter switch 35 closes, exciter current flows to recharge the battery D, as follows: Wire 39, wire 61, switch 62, wire 63, series coil 64, wire 64—A, switch 65, wire 66, wire 29 to positive battery E, back from negative battery E over wire 16, wire 16—A, wire 36 to negative pole of exciter C. A slightly higher speed of the engine while accelerating to speed cycle, brings contact ring 59—A of J—1 in electrical contact with spring contacts 59 and 60. Therefore current flows to the shunt coil 68 of the battery switch 65, energizing coil 68 as follows: Positive exciter current over wire 39, wire 61, switch 62, wire 67, shunt coil 68, wire 69, spring contactor 60, contact ring of disc J—1, 59—A, spring contact 59, wire 70, wire 71, switch 7, wires 15, wire 16, wire 16—A, and wire 36 back to negative pole of exciter C.

Single pole double throw switch P is provided for manual starting of unit by by-passing switch 7, and opening the circuit to alternator switch 53 to prevent alternator B from being connected to the load line. This is accomplished by throwing the blade of switch P, from X over to Y, thus disconnecting wires 52 and 71—A.

Switches 3 and 3—1 are manually operated to disconnect either or both alternators from the load line, and are normally closed during automatic action of these units.

When solenoid G has a predetermined decreased current through its coil 6, switch 7 will open and alternator switch 53 will open both switches 54 and 55, fuel valve 85 will shut off the engine fuel and as the engine slows down, current to the exciter switch will be opened, thus cutting off the parallel connection to the other exciter, and discontinue the battery charging current (if it has not been previously cut) through the action of fly-ball slide contactor H.

Main alternator switch 54 may be of the oil type on heavy current use to prevent arcing on making and breaking contact.

I am aware that the particular embodiment of my invention above described, and illustrated in the accompanying drawing, is susceptible of considerable variation without departing from the spirit thereof, and therefore I desire to claim as my invention broadly, as well as specifically, as indicated by the appended claims.

Having thus described my invention, what I claim as new and desire to secure by Letters Patent is:

1. An electric generating system, including a first alternator operatively connected to a current power line circuit, a second alternator, a combustion engine operatively connected to said second alternator, means including a current responsive switch in said current power line circuit for automatically cranking said combustion engine and introducing fuel therein when the load on said circuit has exceeded a predetermined amount, and means for stepping in said second alternator into the circuit when said first and second alternators are running in phase.

2. An electric generating system including a first alternator connected to a current power line circuit, a second alternator, means operable when the load on said circuit has exceeded a predetermined amount for accelerating the speed of said second alternator, a second electric circuit having a switch which is automatically closed when said second alternator reaches a predetermined speed, said second circuit including a pair of switches, each of said switches being operated by one of said alternators, and intermittently closed in accordance with the speed of its associated alternator, said intermittently operated switches being so adjusted that both of said switches will be closed at the same time when the two alternators are in the same phase position, and a switch operable when said second circuit is closed, for stepping said second alternator into said power line circuit.

3. An electric generator including a first alternator connected to a current power line circuit, a second alternator, a prime mover operatively connected to said second alternator, an auxiliary power member for initiating the operation of said prime mover, means for starting said auxiliary power member for initiating the operation of said prime mover, means for automatically stopping the operation of said auxiliary prime mover upon the failure of said second alternator to attain a predetermined speed a predetermined time after the operation of said auxiliary power means has been initiated, and means for stepping said second alternator into said circuit in phase with said first alternator after said second alternator has attained a predetermined speed.

4. An electric generator including a first alternator connected to a current power line circuit, a second alternator, an internal combustion engine operatively connected to said second alternator, a motor for cranking said engine, means for automatically closing the motor circuit to start said motor, for initiating the operation of said engine, means for automatically opening said motor circuit upon the failure of said second alternator to attain a predetermined speed a predetermined time after the operation of said motor has been initiated, and means for stepping said second alternator into said circuit in phase with said first alternator after said second alternator has attained a predetermined speed.

5. An electric generating system including a first alternator connected to a current power line circuit, a second alternator, a prime mover operatively connected to said second alternator, means for starting said prime mover, an electric circuit including a switch having a movable contact member movable in accordance with the speed of said prime mover to close said switch when said prime mover has attained a predetermined speed, a pair of switches in said last mentioned circuit, each of which is operated by one of said alternators, and intermittently closed in accordance with the speed of its associated alternator, said last mentioned switches being so adjusted that both of them will be closed at the same time when the two alternators are in the same phase position, whereby said second circuit will be closed in that position, and a switch operated when said last mentioned circuit is closed, for stepping said second alternator into said current power line circuit.

6. An electric generating system including a first alternator connected to a current power line circuit, a second alternator, a prime mover operatively connected to said second alternator, auxiliary power means including an electric motor for starting the operation of said prime mover, means for automatically starting said motor by closing its circuit when the load on said power line circuit has exceeded a predetermined amount, the the motor circuit including a switch having a contact member which is movable in accordance with the speed of said prime mover, and which when said prime mover is inactive, is in position to close said switch, said movable contact member being actuated in response to the speed of said prime mover to open said switch, when said prime mover has attained a predetermined speed, whereby said motor is stopped, and means for stepping said second alternator into said circuit when said second alternator has attained the same phase relationship as said first alternator.

7. An electric generating system including a first alternator operatively connected to a current power line circuit, a second alternator, a prime mover operatively connected to said second alternator, auxiliary power means including an electric motor for starting the operation of said prime mover, means for automatically starting said motor by closing its circuit when the load on said circuit has exceeded a predetermined amount, the motor circuit including a switch having a contact member which is movable in accordance with the speed of said prime mover, and which when said prime mover is inactive, is in position to close said switch, said movable contact member being actuated in response to the speed of said prime mover to open said switch when said prime mover has attained a predetermined speed, whereby said motor is stopped when said prime mover has attained a predetermined speed, means for connecting the exciters of both of said alternators in parallel when said prime mover has attained a predetermined speed, an electric circuit including a pair of switches, each of which is operated by one of said alternators, and intermittently closed in accordance with the speed of its associated alternators, said switches being so positioned that both will be closed at the same time when the two alternators are in the same phase position, said last mentioned circuit including another switch having a contact member movable in accordance with the speed of said second alternator, and movable to close said last mentioned switch when said second alternator has attained a predetermined speed, whereby said last mentioned circuit will be closed, and a switch operated by said last mentioned circuit to step said second alternator into said first mentioned current power line circuit in phase with said first alternator.

HOWARD FIELD CARPENTER.